(12) United States Patent
Klein et al.

(10) Patent No.: US 11,673,372 B2
(45) Date of Patent: Jun. 13, 2023

(54) LAMINATED VEHICLE PANE WITH OPAQUE POLYMERIC FILM

(71) Applicant: SAINT-GOBAIN GLASS FRANCE, Courbevoie (FR)

(72) Inventors: Marcel Klein, Baesweiler (DE); Michael Kolf, Eschweiler (DE); Valentin Schulz, Niederzier (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/049,860

(22) PCT Filed: Jul. 8, 2019

(86) PCT No.: PCT/EP2019/068215
§ 371 (c)(1),
(2) Date: Oct. 22, 2020

(87) PCT Pub. No.: WO2020/020613
PCT Pub. Date: Jan. 30, 2020

(65) Prior Publication Data
US 2021/0237403 A1    Aug. 5, 2021

(30) Foreign Application Priority Data

Jul. 23, 2018 (EP) ........................................ 8184879

(51) Int. Cl.
*B32B 17/10* (2006.01)
(52) U.S. Cl.
CPC .. *B32B 17/10357* (2013.01); *B32B 17/10036* (2013.01); *B32B 17/1077* (2013.01);
(Continued)

(58) Field of Classification Search
CPC ........... B32B 5/145; B32B 3/26; B32B 3/263; B32B 17/06; B32B 17/10;
(Continued)

(56) References Cited

U.S. PATENT DOCUMENTS

2016/0243796 A1   8/2016   Mannheim et al.
2017/0232713 A1*  8/2017   Mannheim Astete ......................
                                                B32B 17/10036
                                                428/172
(Continued)

FOREIGN PATENT DOCUMENTS

CN          102804912 A      11/2012
CN     10 2012 018001 A1      5/2013
(Continued)

OTHER PUBLICATIONS

International Search Report as issued in International Patent Application No. PCT/EP2019/068215, dated Sep. 4, 2019.
(Continued)

*Primary Examiner* — Frank J Vineis
*Assistant Examiner* — Nicole T Gugliotta
(74) *Attorney, Agent, or Firm* — Pillsbury Winthrop Shaw Pittman LLP

(57) ABSTRACT

A laminated vehicle includes an outer pane and an inner pane that are joined to one another via at least one thermoplastic intermediate layer and an opaque polymeric film that is arranged between the outer pane and the inner pane, wherein the opaque polymeric film has at least one cutout.

19 Claims, 7 Drawing Sheets

Figure 1:
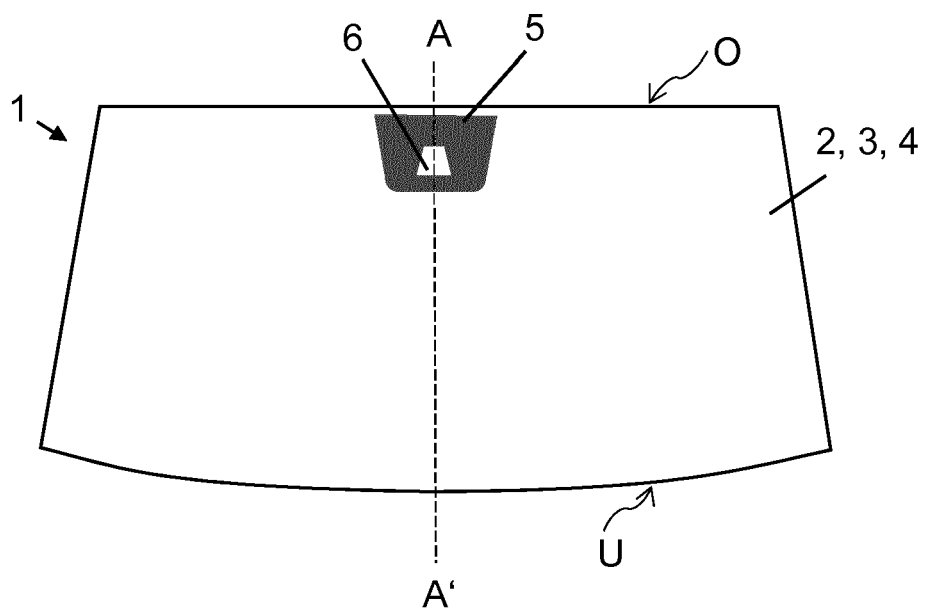

(52) U.S. Cl.
CPC .. *B32B 17/10293* (2013.01); *B32B 17/10761* (2013.01); *B32B 17/10779* (2013.01); *B32B 17/10788* (2013.01); *B32B 17/10807* (2013.01); *B32B 2250/40* (2013.01); *B32B 2270/00* (2013.01); *B32B 2307/402* (2013.01); *B32B 2307/41* (2013.01); *B32B 2605/006* (2013.01)

(58) Field of Classification Search
CPC ........ B32B 17/10348; B32B 17/10036; B32B 17/10275; B32B 17/10568; B32B 17/1066; B32B 17/10761; B32B 2605/00; B32B 2605/006; B32B 17/10339–10357; B32B 17/10293; B32B 2307/41; B32B 17/1055–10798; Y10T 428/24479; B60S 1/0833–0848; B60S 1/0825; B60S 1/0829; B60W 2420/40–406; B60W 2420/42; B60R 2300/00–8093
USPC ........................................................ 428/156
See application file for complete search history.

(56) References Cited

U.S. PATENT DOCUMENTS

| | | | |
|---|---|---|---|
| 2017/0297310 A1 | 10/2017 | Mannheim et al. | |
| 2017/0341491 A1* | 11/2017 | Nakagawa | C03C 17/04 |
| 2019/0022981 A1 | 1/2019 | Labrot et al. | |
| 2019/0022985 A1* | 1/2019 | Labrot | B32B 17/10788 |
| 2020/0391577 A1* | 12/2020 | Bard | B32B 17/10889 |

FOREIGN PATENT DOCUMENTS

| | | | | |
|---|---|---|---|---|
| CN | 107046805 A | 8/2017 | | |
| CN | 107206754 A | 9/2017 | | |
| DE | 10 2005 062272 A1 | 6/2007 | | |
| DE | 107848271 A | 3/2018 | | |
| EP | 3 216 655 A1 | 9/2017 | | |
| JP | 2006-327381 A | 12/2006 | | |
| JP | 2015-513684 A | 5/2015 | | |
| JP | 2015-513684 A1 * | 5/2015 | ............. | C05C 27/00 |
| JP | 2016-088493 A * | 5/2016 | ................ | B60J 1/00 |
| WO | WO 2013/127563 A1 | 9/2013 | | |
| WO | WO 2015/041106 A1 | 3/2015 | | |
| WO | WO 2015/186839 A1 | 12/2015 | | |
| WO | WO 2017/103428 A1 | 6/2017 | | |
| WO | WO 2017/115041 A1 | 7/2017 | | |

OTHER PUBLICATIONS

Notice of Reasons for Refusal as issued in Japanese Patent Application No. 2021-500447, dated Dec. 24, 2021.
Notice of Reasons for Refusal as issued in Japanese Patent Application No. 2021-500447, dated Jun. 27, 2022.
Office Action as issued in Korean Patent Application No. 10-2021-7001674, dated Dec. 26, 2022.
Second Office Action and Search Report as issued in Chinese Patent Application No. 201980002065.0, dated Feb. 15, 2023.
Final Notice of Preliminary Rejection as issued in Korean Patent Application No. 10-2021-7001674, dated Apr. 6, 2023.

* cited by examiner

LAMINATED VEHICLE PANE WITH OPAQUE POLYMERIC FILM

CROSS-REFERENCE TO RELATED APPLICATIONS

This application is the U.S. National Stage of PCT/EP2019/068215, filed Jul. 8, 2019, which in turn claims priority to European patent application number 18184879.7 filed Jul. 23, 2018. The content of these applications are incorporated herein by reference in their entireties.

The invention relates to a laminated vehicle pane, a method for its production, and its use.

Modern vehicles are equipped with an increasing number of optical sensors whose signals are used to assist the driver. Examples of such sensors are cameras such as video cameras or night vision cameras, rain sensors, light sensors, or distance meters. Forward directed sensors are frequently secured on the interior-side surface of the windshield, typically centrally in the vicinity of the upper edge. In the prior art, the sensors are obscured by an opaque masking print on the windshield. For this, the customary, peripheral, frame-like masking print, which primarily serves as UV protection for the assembly adhesive of the windshield, is significantly enlarged in the direction of the center of the pane in the region of the sensors.

Conventional sensors are mounted on the windshield such that their detection direction runs horizontally. Since the windshield is installed in the vehicle greatly inclined, for example, at an installation angle of 60° relative to the vertical, the detection direction of the sensor encloses a very acute angle of approx. 30° with the windshield. This yields a relatively large, substantially trapezoidal so-called "sensor window" of the windshield. The sensor window is that region of the windshield by which radiation passing through is detected by the sensor. The sensor window of the windshield is, thus, the region that lies in the detection beam path of the sensor.

The more sensors to be secured on the pane, the more area of the windshield is occupied by the total of the sensor regions, and the larger the masking print intended to obscure the sensors has to be.

During the production of a laminated vehicle pane, the masking print is applied on the outer pane or the inner pane by screen printing before the bending of the individual panes. During the bending process, which is usually carried out at temperatures from 500° C. to 700° C., the heat is absorbed more by the screen print than by the respective pane. This can result in optical distortions of sensor windows surrounded by screen printing, in particular black printing, and/or in glass breakage.

US 2019/0022981 A1 discloses a laminated vehicle glazing that includes an AMOLED screen and a sensor within the laminate. The AMOLED screen is situated in the region of the clear window or is masked by the outer peripheral masking layer between the second primary surface of the first pane and the rear surface of the AMOLED screen and a connection part part is likewise optionally masked by the outer masking layer.

EP 3 216 655 A1 proposes supporting a sensor by means of a mount such that the beam path passes through the sensor window at least 4 mm from the outer corners of the sensor window. This is intended to minimize the influence on the sensor of optical distortions caused by the heat absorption of the screen printing as much as possible.

WO 2015/186839 A1 proposes covering the optically distorted regions of the sensor window with a dark shielding layer that is secured to one of the panes by means of an adhesive. Alternatively proposed is replacing the enamel layer surrounding the camera window, at least in sections, by a shielding layer secured by means of an adhesive in order to avoid optical distortions.

The object of the present invention is to provide an improved laminated vehicle pane in which in particular the optical quality of the sensor window is improved and/oder the risk of glass breakage during the bending process is reduced.

The object of the present invention is accomplished according to the invention by a laminated vehicle pane in accordance with claim 1. Preferred embodiments are apparent from the subclaims.

The laminated vehicle pane according to the invention comprises at least one outer pane and one inner pane that are joined to one another via at least one thermoplastic intermediate layer and an opaque polymeric film that is arranged between the outer pane and the inner pane, wherein, according to the invention, the opaque polymeric film has at least one cutout.

The outer pane and the inner pane are typically made of glass. The laminated pane is intended for separating a vehicle interior from an external environment. The laminated vehicle pane is thus a window pane that is inserted in a window opening of the vehicle body or is intended for this. The laminated vehicle pane according to the invention is in particular a windshield of a motor vehicle.

The term "inner pane" refers to that pane that is intended to face the interior of the vehicle in the installed position. "Outer pane" refers to that pane that is intended to face the external environment of the vehicle in the installed position. That surface of the respective pane that faces the external environment in the installed position is referred to as the exterior-side surface. That surface of the respective pane that faces the interior of the vehicle in the installed position is referred to as the interior-side surface.

The region of the laminated vehicle pane that is arranged in the detection beam path of a sensor or is intended for that purpose is referred to as the sensor region or sensor window. Radiation that passes through the laminated vehicle pane in the sensor window is detected by the sensor.

When the sensor is a camera, the region of the laminated vehicle pane that is arranged in the detection beam path or is intended for that purpose can be referred to as the camera region or the camera window. Radiation that passes through the laminated vehicle pane in the camera window is detected by the camera.

In a preferred embodiment of a laminated vehicle pane according to the invention, the at least one cutout in the opaque polymeric film is a sensor window for an optical sensor.

The laminated vehicle pane according to the invention is in particular provided for and suitable for securing an optical sensor on its inner pane. For that purpose, the interior-side surface of the inner pane can be equipped with suitable mounts, for example, with a bracket or a housing.

The optical sensors are preferably cameras such as video cameras or night vision cameras, rain sensors, light sensors, distance meters, or LIDAR (light detection and ranging) systems. If there is more than one optical sensor, the type of the individual optical sensors can also be different.

In one embodiment, the laminated vehicle pane additionally includes at least one optical sensor that is secured on the interior-side surface of the inner pane and is directed toward the at least one cutout. When looking through the laminated vehicle pane from the outside, the sensor is preferably covered by the opaque polymeric film and is thus not visible from the outside.

Preferably, the number of cutouts in the opaque polymeric film corresponds to the number of optical sensors such that in each case one sensor is directed toward one cutout. However, it is also possible for the number of cutouts to be less than the number of sensors such that multiple sensors are directed toward the same cutout.

In one embodiment, the at least one cutout is trapezoidal. A trapezoidal cutout is in particular suitable as a sensor window for a camera. In another embodiment, the at least one cutout is circular or oval. A circular or oval cutout is in particular suitable as a sensor window for a rain sensor. When the opaque polymeric film has more than one cutout, they can also have different shapes.

The area of the at least one cutout corresponds at least to the size of the sensor window required for the respective sensors, preferably exactly to the size of the sensor window required for the respective sensors. The cutout preferably has an area of at least 1 $cm^2$, particularly preferably of 1 $cm^2$ to 500 $cm^2$, most particularly preferably of 10 $cm^2$ to 250 $cm^2$, in particular of 20 $cm^2$ to 100 $cm^2$, for example, 35 $cm^2$. When the opaque polymeric film has more than one cutout, their areas can be different.

The outer pane, the inner pane, and the at least one thermoplastic intermediate layer usually have the same dimensions.

In terms of its dimensions, the opaque polymeric film is preferably smaller than the outer pane, the inner pane, and the at least one thermoplastic intermediate layer. For example, the opaque polymeric film only partially covers the inner pane. The area of the opaque polymeric film is, in one embodiment, at most 95%, preferably at most 75%, particularly preferably at most 50%, most particularly preferably at most 10% of the area of the laminated vehicle pane.

In a preferred embodiment, the opaque polymeric film is made of polyethylene terephthalate (PET) or polyethylene (PE), in particular of PET.

The opaque polymeric film is preferably between 10 μm (microns) and 80 μm thick, particularly preferably between 20 μm and 60 μm, most particularly preferably between 25 μm and 50 μm. In preferred embodiments, the opaque polymeric film is 25 μm or 50 μm thick.

The at least one thermoplastic intermediate layer preferably contains ethylene vinyl acetate (EVA), polyvinyl butyral (PVB), or polyurethane (PU) or mixtures or copolymers or derivatives thereof, particularly preferably PVB. The thickness of the thermoplastic intermediate layer is preferably from 0.2 mm to 2 mm, particularly preferably from 0.3 mm to 1 mm, for example, 0.38 mm or 0.76 mm. When the laminated vehicle pane includes two or more thermoplastic intermediate layers, the individual intermediate layers can also be of different materials.

In one embodiment, the laminated vehicle pane comprises an outer pane and an inner pane that are joined to one another via exactly one thermoplastic intermediate layer. In this case, the opaque polymeric film is arranged between the inner pane and the thermoplastic intermediate layer or between the outer pane and the thermoplastic intermediate layer.

In another embodiment, the laminated vehicle pane comprises an outer pane and an inner pane that are joined to one another via at least two thermoplastic intermediate layers. In this case, the opaque polymeric film is preferably arranged between two of the thermoplastic intermediate layers.

In a preferred embodiment of a laminated vehicle pane according to the invention, the opaque polymeric film is black. The opaque polymeric film can, however, also be any other color.

A laminated vehicle pane according to the invention can additionally include a masking print, made of a dark, preferably black, enamel. Preferably, the opaque polymeric film and the masking print have substantially the same optical density. The masking print is in particular a peripheral, i.e., frame-like, masking print. The peripheral masking print serves primarily as UV protection for the assembly adhesive of the laminated pane. The masking print can be opaque and cover the entire surface. The masking print can also be implemented semitransparent, at least in sections, for example, as a grid, a strip grid, or a checkered grid. Alternatively, the masking print can also have a gradient, for example, from an opaque covering to a semitransparent covering.

"Substantially the same optical density" means that the optical densities of two materials differ from one another by most 5%, preferably by 3%, particularly preferably by at most 2%.

In a preferred embodiment of a laminated pane according to the invention, it includes a masking print that has the same color as the opaque polymeric film.

The masking print is usually applied to the interior-side surface of the outer pane or to the interior-side surface of the inner pane.

In one embodiment, the laminated vehicle pane comprises an outer pane and an inner pane that are joined to one another via exactly one thermoplastic intermediate layer, and a masking print is applied to the interior-side surface of the outer pane. In this case, the opaque polymeric film is preferably arranged between the outer pane and the thermoplastic intermediate layer.

In another embodiment, the laminated vehicle pane comprises an outer pane and an inner pane that are joined to one another via exactly one thermoplastic intermediate layer, and a masking print is applied to the interior-side surface of the inner pane. In this case, the opaque polymeric film is preferably arranged between the inner pane and the thermoplastic intermediate layer.

In another embodiment, the laminated vehicle pane comprises an outer pane and an inner pane that are joined to one another via two thermoplastic intermediate layers, and a masking print is applied to the interior-side surface of the inner pane. In this case, the opaque polymeric film is preferably arranged between the inner pane and the thermoplastic intermediate layer adjacent the inner pane or between the two thermoplastic intermediate layers.

In another embodiment, the laminated vehicle pane comprises an outer pane and an inner pane that are joined to one another via two thermoplastic intermediate layers, and a masking print is applied to the interior-side surface of the outer pane. In this case, the opaque polymeric film is preferably arranged between the outer pane and the thermoplastic intermediate layer adjacent the outer pane or between the two thermoplastic intermediate layers.

Preferably, the opaque polymeric film is, in each case, arranged between the outer and the inner pane as directly adjacent as possible to the pane to which the masking print is applied.

The outer pane, the inner pane, or the thermoplastic intermediate layer can be clear and colorless, but also tinted, frosted, or colored. The total transmittance through the laminated vehicle pane is, in a preferred embodiment, greater than 70%, in particular when the laminated vehicle pane is a windshield. The term "total transmittance" is based on the process for testing the light permeability of motor vehicle windows specified by ECE-R 43, Annex 3, § 9.1. The outer pane and the inner pane can be made of non-tempered, partially tempered, or tempered glass. The thickness of the outer pane and of the inner pane is typically from 0.3 mm to 5 mm, preferably from 1 mm to 3 mm.

The laminated vehicle pane is preferably curved in one or a plurality of spatial directions, as is customary for motor vehicle windows, with typical radii of curvature in the range from approx. 10 cm to approx. 40 m. The laminated glass can, however, also be flat, for example, when it is intended as a pane for buses, trains, or tractors.

In one embodiment, the laminated vehicle pane is a windshield that is mirror-symmetrical along a center line, and the opaque polymeric film is arranged on the center line in the vicinity of the upper edge of the windshield.

A further aspect of the invention is an arrangement comprising a laminated vehicle pane according to the invention and an optical sensor applied thereon that is secured to the interior-side surface away from the intermediate layer and is directed toward the sensor window of the laminated pane, i.e., toward the region of the cutout in the opaque polymeric film. The detection beam path of the sensor thus runs through the cutout in the opaque polymeric film. The optical sensor is preferably an optical camera, in other words, a camera with sensitivity in the visible spectral range, for example, a lane camera or camera for an augmented reality head-up display.

The invention also relates to a method for producing a laminated vehicle pane, at least comprising the following steps:
(a) Providing an outer pane, an inner pane, at least one thermoplastic intermediate layer, and an opaque polymeric film, wherein the opaque polymeric film has at least one cutout;
(b) Arranging the at least one thermoplastic intermediate layer and the opaque polymeric film between the outer pane and the inner pane; and
(c) Joining the outer pane to the inner pane via the at least one thermoplastic intermediate layer by lamination.

The arranging of the opaque polymeric film can be done manually or mechanically, for example, by means of a robot.

The opaque polymeric film is held in position by the at least one laminated-in thermoplastic layer. The use of an adhesive is usually unnecessary. Thus, the method according to the invention preferably does not include a step of securing the opaque polymeric film by means of an adhesive.

If the laminated pane is to have a curve, as is customary in particular for passenger cars, the panes are subjected to a bending process before lamination, for example, by gravity bending, suction bending, and/or press bending. Typical bending temperatures are from 500° C. to 700° C.

Preferably, before lamination and before the optional bending, an opaque masking print is applied, in particular to the edge region of the outer pane and/or the inner pane. For this, a black or dark enamel is typically applied by screen printing and fired before lamination, in particular before bending or during bending.

The invention also relates to the use of a laminated vehicle pane according to the invention as a windshield of a vehicle, preferably a motor vehicle.

In the following, the invention is explained in detail with reference to drawings and exemplary embodiments. The drawings are schematic representations and not to scale. The drawings in no way restrict the invention.

They depict:
FIG. 1 plan view of an embodiment of the laminated vehicle pane according to the invention,
FIG. 2 cross-section through the laminated vehicle pane according to the invention of FIG. 1 along the line A-A',
FIG. 3 cross-section through another embodiment of the laminated vehicle pane according to the invention,
FIG. 4 plan view of another embodiment of the laminated vehicle pane according to the invention,
FIG. 5 plan view of another embodiment of the laminated vehicle pane according to the invention,
FIG. 6 plan view of another embodiment of the laminated vehicle pane according to the invention,
FIG. 7 plan view of another embodiment of the laminated vehicle pane according to the invention,
FIG. 8 plan view of another embodiment of the laminated vehicle pane according to the invention,
FIG. 9 plan view of another embodiment of the laminated vehicle pane according to the invention,
FIG. 10 cross-section through the laminated vehicle pane according to the invention of FIG. 9 along the line A-A',
FIG. 11 a flow chart of one embodiment of the method according to the invention, and
FIG. 12 cross-section through the laminated vehicle pane according to an embodiment of the invention.

Figure 2:
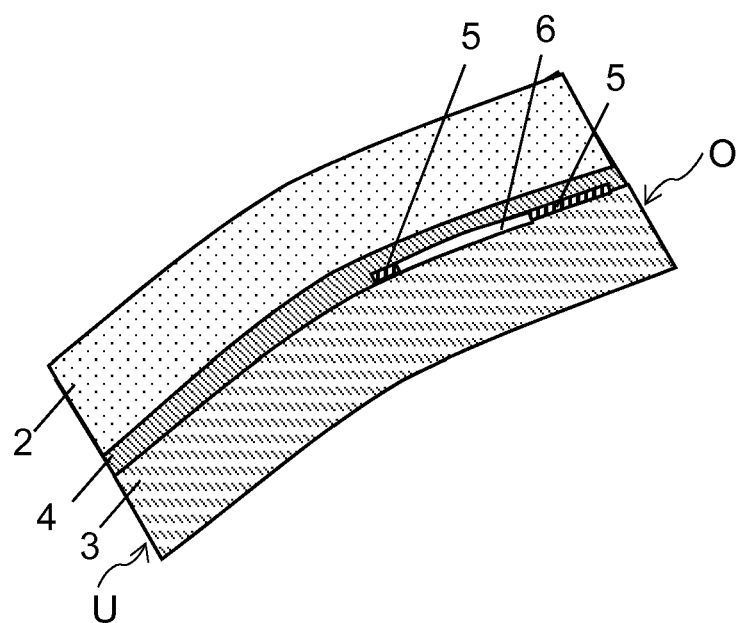

FIG. 1 depicts an embodiment of the laminated vehicle pane 1 according to the invention, and FIG. 2 depicts the cross-section through the laminated vehicle pane 1 according to the invention of FIG. 1 along the line A-A', which corresponds to the center line M. The laminated vehicle pane 1 depicted in FIG. 1 is mirror-symmetrical along the center line M and the opaque polymeric film 5 is arranged on the center line in the vicinity of the upper edge. In the embodiment depicted in FIGS. 1 and 2, the laminated vehicle pane 1 comprises an outer pane 2 and an inner pane 3 that are joined to one another, surface-to-surface, via a thermoplastic intermediate layer 4. The outer pane 2 and the inner pane 3 are made of soda lime glass and have, for example, a thickness of 2.1 mm. Arranged between the inner pane 3 and the thermoplastic intermediate layer 4 is an opaque polymeric film 5 that has a cutout 6. In the embodiment depicted in FIGS. 1 and 2, the opaque polymeric film 5 is arranged between the inner pane 3 and the thermoplastic intermediate layer 4. The opaque polymeric film 5 can, however, also be arranged between the outer pane 2 and the thermoplastic intermediate layer 4. In addition, the laminated vehicle pane 1 according to the invention can also include more than one thermoplastic intermediate layer 4. The thermoplastic intermediate layer 4 is made of polyvinyl butyral (PVB) and is 0.76 mm thick. The opaque polymeric film 5 is made of polyethylene terephthalate (PET) and is 25 μm (microns) thick. In the embodiment depicted in FIGS. 1 and 2, the cutout 6 is trapezoidal and has an area of 35 cm$^2$. However, any other shape suitable for a sensor window is also possible. The opaque polymeric film 5 has, in the embodiment depicted in FIGS. 1 and 2, a trapezoidal shape wherein the corners pointing toward the lower edge are rounded. However, any other outer shape of the opaque polymeric film 6 suitable for masking a sensor is also possible. In the embodiment depicted in FIGS. 1 and 2, the opaque polymeric film 5 is dark gray. It can, however, also have any other color, for example, black. The inner pane 3 faces the interior of the vehicle in the installed position. The outer pane 2 faces the external environment of the vehicle in the installed position. The laminated pane has an upper edge O and a lower edge U. In the installed position, the upper edge O points upward toward the vehicle roof; the lower edge points, in the installed position, downward toward the engine compartment.

The interior-side surface of the outer pane 2 is joined to the exterior-side surface of the inner pane 3 via the thermoplastic intermediate layer 4. Customarily, the exterior-side surface of the outer pane 2 is referred to as "side I"; the interior-side surface of the outer pane 2, as "side II"; the exterior-side surface of the inner pane 3 as "side III"; and the interior-side surface of the inner pane 3 as "side IV".

Figure 3:
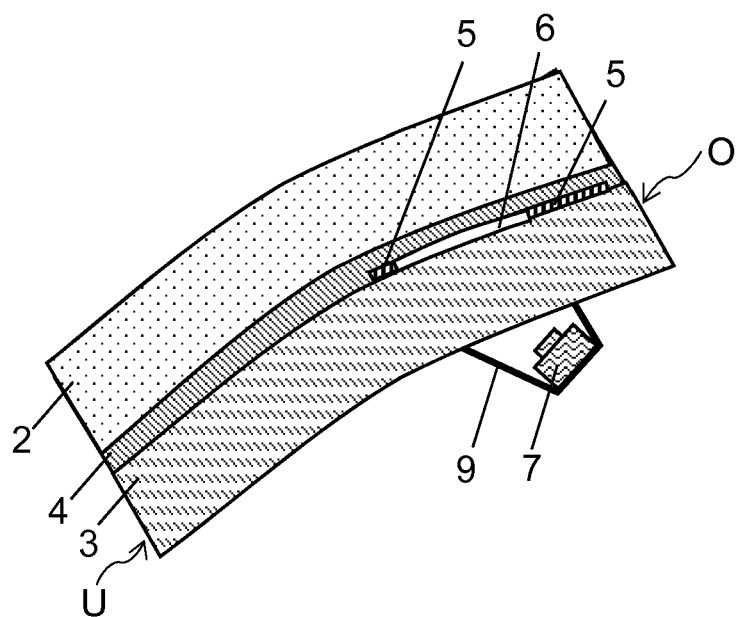

FIG. 3 depicts the cross-section through another embodiment of a laminated vehicle pane 1 according to the invention, wherein, additionally, an optical sensor 7 that is mounted on the inner pane 3 on the interior side via a mount and is directed toward the cutout 6 is also sketched in. The optical sensor 7 is, for example, a lane camera. The detection direction of the optical sensor 7 is directed roughly horizontally forward outside the laminated vehicle pane 1. Radiation that enters horizontally through the laminated vehicle pane in a so-called "sensor window", which corresponds to the region of the cutout 6 in the embodiment depicted in FIG. 3, is detected by the optical sensor 7.

Figure 4:
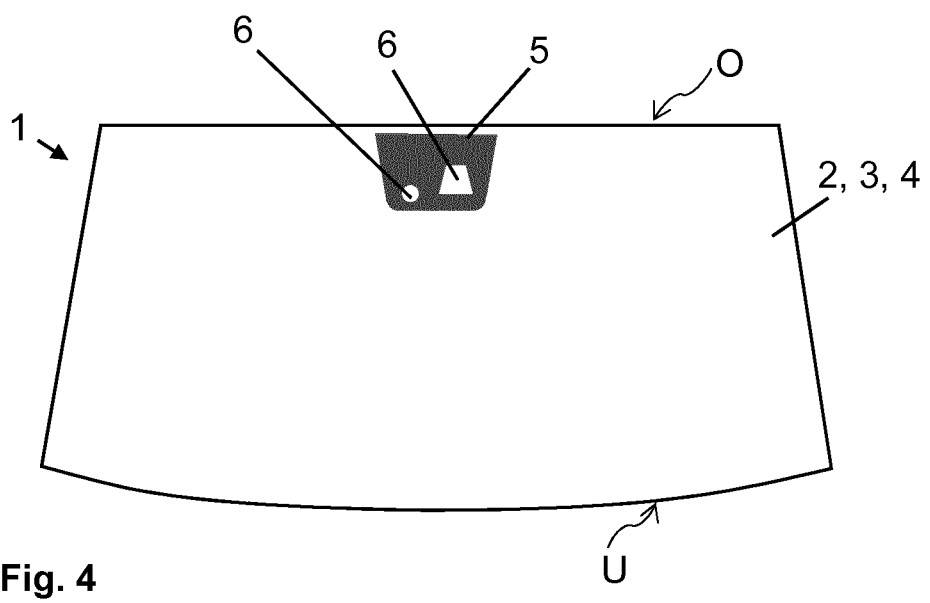

FIG. 4 depicts another embodiment of a laminated vehicle pane 1 according to the invention. The laminated vehicle pane 1 depicted in FIG. 3 differs from the embodiment depicted in FIG. 1 only in that the opaque polymeric film 5 has two cutouts 6, wherein one cutout 6 is trapezoidal and one cutout 6 is circular.

Figure 5:
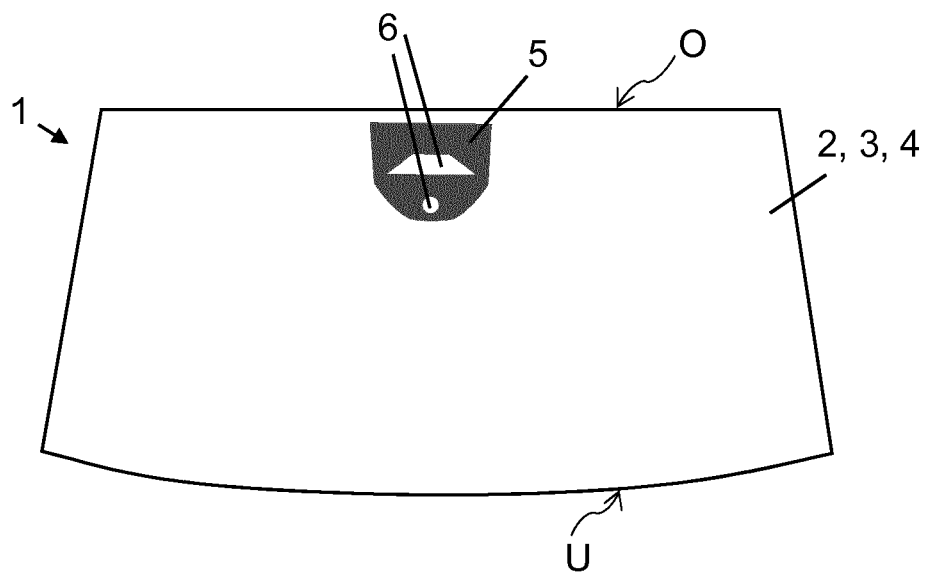

FIG. 5 depicts another embodiment of a laminated vehicle pane 1 according to the invention. The laminated vehicle pane 1 depicted in FIG. 5 differs from the embodiment depicted in FIG. 4 only in that the trapezoidal cutout 6 is larger and the cutouts are arranged not side-by-side but are arranged one above the other. In addition, the outer shape of the opaque polymeric film 5 in the embodiment depicted in FIG. 5 differs from the outer shape of the opaque polymeric film 5 in the embodiment depicted in FIG. 4.

Figure 6:
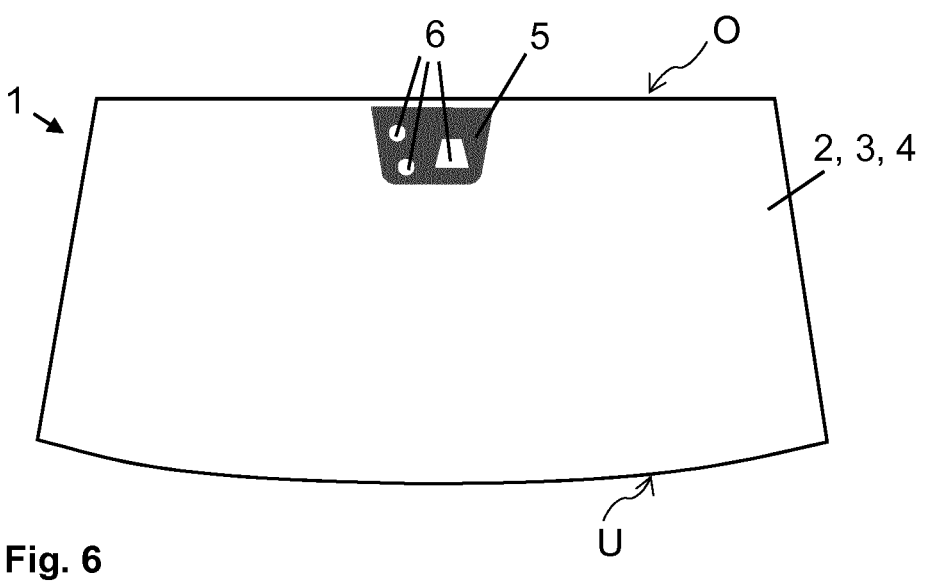

FIG. 6 depicts another embodiment of a laminated vehicle pane 1 according to the invention. The laminated vehicle pane 1 depicted in FIG. 6 differs from the embodiment depicted in FIG. 4 only in that the opaque polymeric film 5 has three cutouts 6, of which one is trapezoidal and two are circular.

Figure 7:
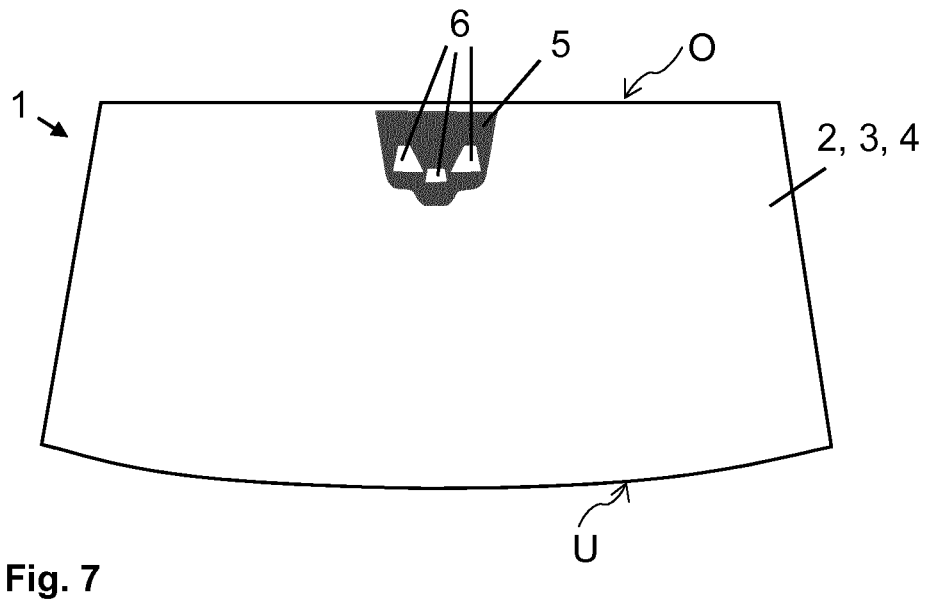

FIG. 7 depicts another embodiment of a laminated vehicle pane 1 according to the invention. It differs from the embodiment depicted in FIG. 6 in that the three cutouts 6 are trapezoidal and are arranged side-by-side and that the opaque polymeric film 5 is extended in the center in the direction of the lower edge U.

Figure 8:
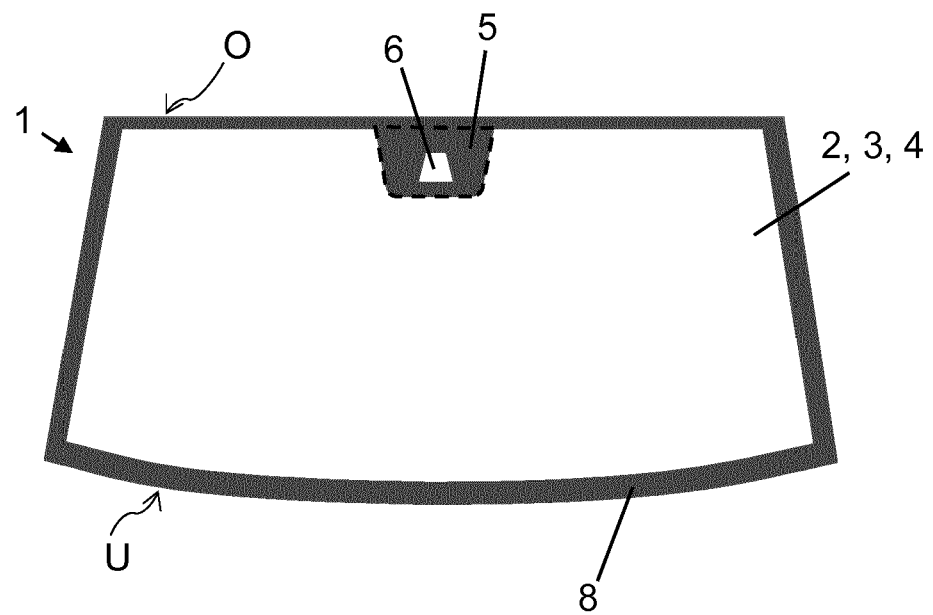

FIG. 8 depicts another embodiment of a laminated vehicle pane 1 according to the invention. The laminated vehicle pane 1 depicted in FIG. 8 differs from that depicted in FIG. 1 only in that it additionally includes a peripheral masking print 8 made of enamel. The opaque polymeric film 5 and the peripheral masking print 8 have substantially the same optical density and are dark gray in the embodiment depicted in FIG. 8. To clarify where the opaque polymeric film 5 is arranged in the embodiment depicted in FIG. 8, this is identified in FIG. 8 with a black dashed border. In the embodiment depicted in FIG. 8, the peripheral masking print 8 is only applied adjacent the outer edges of the laminated vehicle pane 1. However, it is also possible to additionally apply a further masking print 8 on the outside around the opaque polymeric film 5.

Figure 9:
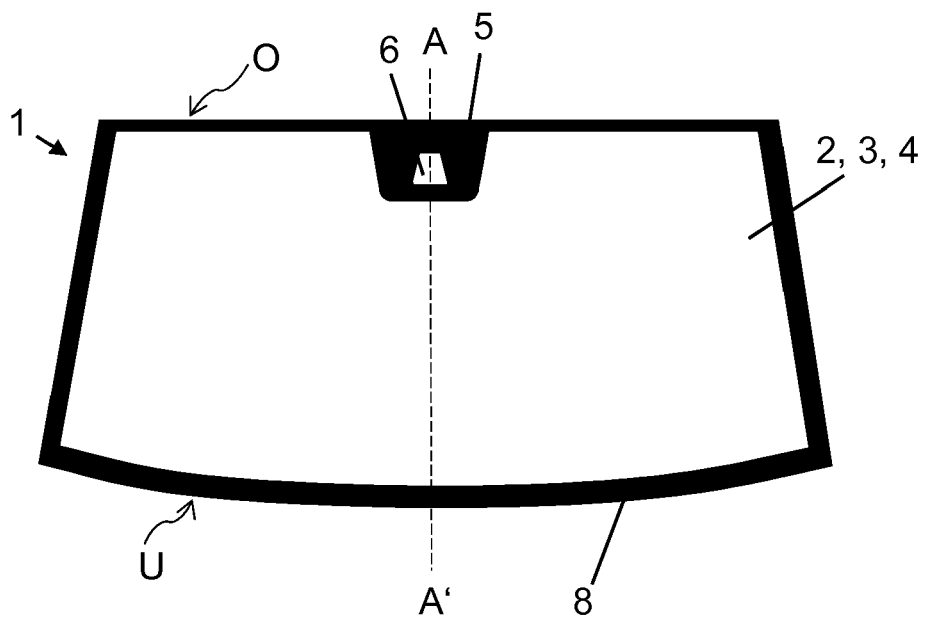

FIG. 9 depicts another embodiment of a laminated vehicle pane 1 according to the invention. The laminated vehicle pane 1 depicted in FIG. 9 differs from that depicted in FIG. 8 only in that the opaque polymeric film 5 and the peripheral masking print 8 are black.

Figure 10:
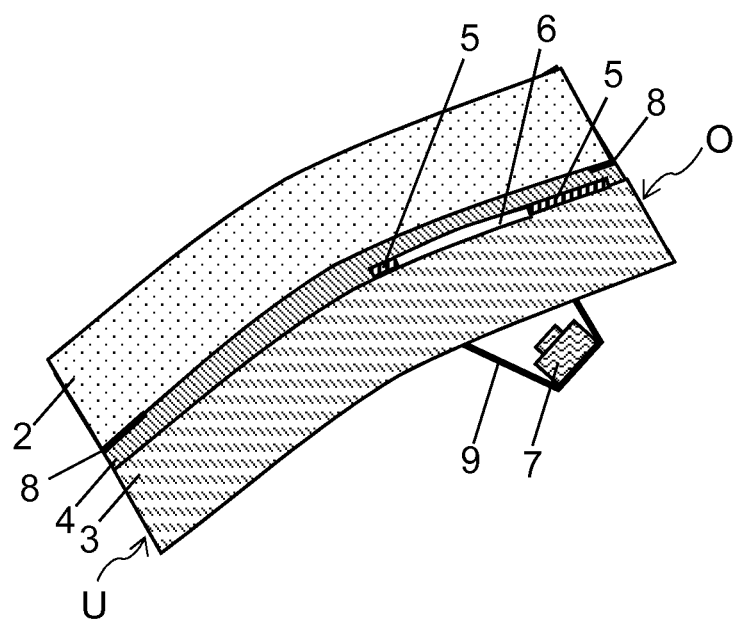

FIG. 10 depicts the cross-section through the laminated vehicle pane 1 according to the invention of FIG. 9 along the line A-A', which corresponds to the center line M, wherein, additionally, an optical sensor 7 in the form of a camera installed via a mount 9 is sketched in. The black masking print 8 is applied on the interior-side surface of the outer pane 2 in the embodiment depicted in FIG. 10.

Figure 11:
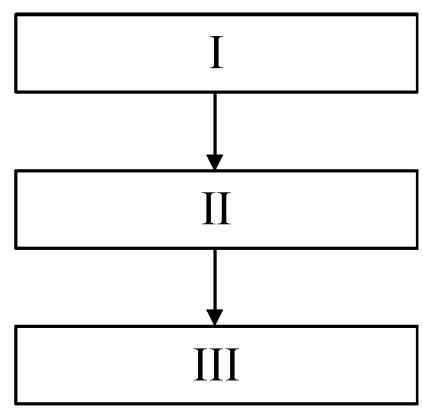

FIG. 11 depicts the flow chart of a method according to the invention for producing a laminated vehicle pane 1 according to the invention. In a first step I, an outer pane 2, an inner pane 3, at least one thermoplastic intermediate layer 4, and an opaque polymeric film 5 that has at least one cutout 6 are provided. In a second step II, the at least one thermoplastic intermediate layer 4 and the opaque polymeric film 5 are arranged between the outer pane 2 and the inner pane 3. In a third step III, the outer pane 2 is joined to the inner pane 3 via the at least one thermoplastic intermediate layer 4 by lamination.

Figure 12:
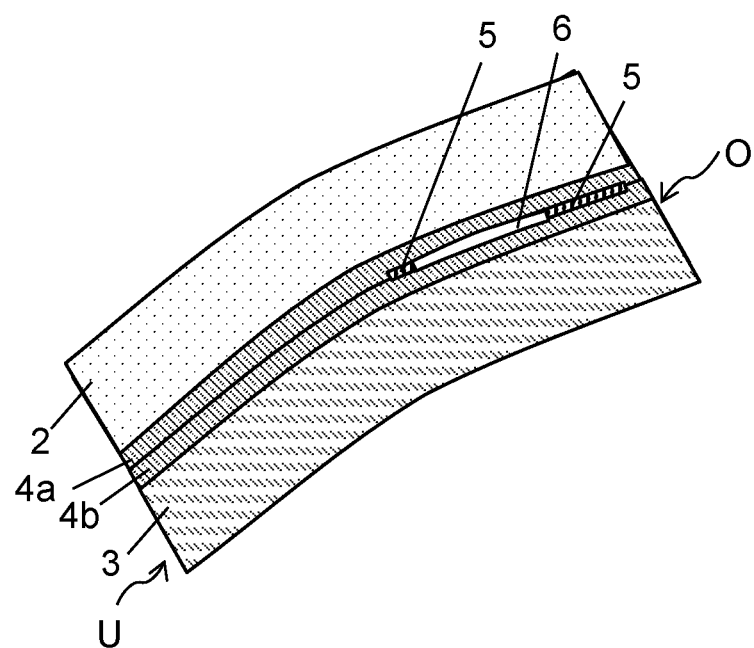

FIG. 12 is a cross-section through the laminated vehicle pane according to an embodiment of the invention. The laminated vehicle pane 1 comprises an outer pane 2 and an inner pane 3 that are joined to one another, surface-to-surface, via a first thermoplastic intermediate layer 4a and a second intermediate layer 4b. As shown in FIG. 12, the opaque polymeric film 5 is arranged between the first and second thermoplastic intermediate layers 4a, 4b.

Example

Tests were carried out to investigate and demonstrate the technical effect of the invention. In the test, a laminated vehicle pane 1 according to the invention, in which a sensor window is bordered by an opaque polymeric film 5, i.e., the sensor window corresponds to the cutout 6 in the opaque polymeric film, is compared to a prior art laminated vehicle pane, in which the sensor window is bordered by an opaque masking print. The opaque masking print was fired at temperatures of 500° C. to 700° C. during the bending of the laminated pane according to the prior art.

The tests showed that optical distortions in the sensor window can be significantly reduced by bordering the sensor window with an opaque polymeric film instead of an optical masking print, for example, from 200 milli-diopters (mdpt) to 100 mdpt.

LIST OF REFERENCE CHARACTERS 1 laminated vehicle pane
2 outer pane
3 inner pane
4 thermoplastic intermediate layer
5 opaque polymeric film
6 cutout
7 optical sensor
8 masking print
9 mount
O upper edge/roof edge of the laminated pane
U lower edge/engine edge of the laminated pane
M center line

The invention claimed is:
1. A laminated vehicle pane comprising:
 an outer pane and an inner pane that are joined to one another via at least one thermoplastic intermediate layer, an opaque polymeric film that is arranged between the outer pane and the inner pane, and an optical sensor secured on an interior-side surface of the inner pane, wherein the opaque polymeric film has at least one cutout, wherein the at least one cutout extends through a thickness of the opaque polymeric film, wherein the opaque polymeric film is made of a film composed of a single layer of polyethylene terephthalate (PET) or polyethylene (PE), wherein the optical sensor is directed toward the at least one cutout, and wherein the at least one cutout is a sensor window for said optical sensor to detect a radiation beam passing through the laminated vehicle pane in said sensor window, said sensor window being defined solely by said at least one cutout formed in the single layer of polyethylene terephthalate (PET) or polyethylene (PE), wherein the at least one thermoplastic intermediate layer contains at least polyvinyl butyral (PVB), ethylene vinyl acetate (EVA), polyurethane (PU), or mixtures or copolymers or derivatives thereof.

2. The laminated vehicle pane according to claim 1, wherein the outer pane and the inner pane are joined to one another via exactly one thermoplastic intermediate layer and the opaque polymeric film is arranged between the inner pane and the thermoplastic intermediate layer or between the outer pane and the thermoplastic intermediate layer.

3. The laminated vehicle pane according to claim 1, wherein the outer pane and the inner pane are joined to one another via at least two thermoplastic intermediate layers and the opaque polymeric film is arranged between two of the thermoplastic intermediate layers.

4. The laminated vehicle pane according to claim 1, wherein a thickness of the opaque polymeric film is between 10 μm and 80 μm.

5. The laminated vehicle pane according to claim 1, wherein the opaque polymeric film is black.

6. The laminated vehicle pane according to claim 1, additionally comprising a masking print, wherein the opaque polymeric film and the masking print have substantially the same optical density and the masking print is a peripheral masking print.

7. The laminated vehicle pane according to claim 1, wherein the at least one cutout has an area of at least 1 cm$^2$.

8. The laminated vehicle pane according to claim 1, wherein the laminated vehicle pane is a curved laminated vehicle pane.

9. The laminated vehicle pane according to claim 8, wherein the laminated vehicle pane is a windshield that is mirror-symmetrical along a center line, and the opaque polymeric film is arranged on the center line in the vicinity of the upper edge of the windshield.

10. A method for producing a laminated vehicle pane according to claim 1, comprising:
providing an outer pane, an inner pane, at least one thermoplastic intermediate layer, and an opaque polymeric film, which has at least one cutout;
arranging the at least one thermoplastic intermediate layer and the opaque polymeric film between the outer pane and the inner pane; and
joining the outer pane to the inner pane via the at least one thermoplastic intermediate layer by lamination.

11. A method comprising utilizing a laminated vehicle pane according to claim 1 as a windshield of a vehicle.

12. The laminated vehicle pane according to claim 1, wherein the opaque polymeric film is made of polyethylene terephthalate (PET).

13. The laminated vehicle pane according to claim 1, wherein the at least one thermoplastic intermediate layer contains polyvinyl butyral (PVB) or polyvinyl butyral (PVB) and plasticizers.

14. The laminated vehicle pane according to claim 4, wherein the thickness of the opaque polymeric film is between 25 μm and 50 μm.

15. The laminated vehicle pane according to claim 7, wherein the area is of 10 cm$^2$ to 250 cm$^2$.

16. The laminated vehicle pane according to claim 8, wherein the curved laminated vehicle pane is a windshield.

17. The laminated vehicle pane according to claim 1, wherein the opaque polymeric film is black or dark grey.

18. The laminated vehicle pane according to claim 1, wherein the opaque polymeric film has a surface area of at most 75% of a surface area of the laminated vehicle pane.

19. A laminated vehicle pane comprising:
an outer pane and an inner pane that are joined to one another via at least one thermoplastic intermediate layer,
an opaque polymeric film that is arranged between the outer pane and the inner pane, and
an optical sensor secured on an interior-side surface of the inner pane,
wherein the opaque polymeric film has at least one cutout,
wherein the at least one cutout extends through a thickness of the opaque polymeric film,
wherein the opaque polymeric film is made of a film of polyethylene terephthalate (PET) or polyethylene (PE),
wherein the optical sensor is directed toward the at least one cutout, and
wherein the at least one cutout is a sensor window for said optical sensor to detect a radiation beam passing through the laminated vehicle pane in said sensor window, an area of the at least one cutout corresponding exactly to a size of the sensor window so that the sensor window is bordered by said opaque polymeric film without being bordered by an opaque masking print,
wherein the at least one thermoplastic intermediate layer contains at least polyvinyl butyral (PVB), ethylene vinyl acetate (EVA), polyurethane (PU), or mixtures or copolymers or derivatives thereof.

* * * * *

UNITED STATES PATENT AND TRADEMARK OFFICE
CERTIFICATE OF CORRECTION

| | | |
|---|---|---|
| PATENT NO. | : 11,673,372 B2 | Page 1 of 1 |
| APPLICATION NO. | : 17/049860 | |
| DATED | : June 13, 2023 | |
| INVENTOR(S) | : Marcel Klein et al. | |

It is certified that error appears in the above-identified patent and that said Letters Patent is hereby corrected as shown below:

On the Title Page

In Item (30) Foreign Application Priority Data, the priority application number should read:
Jul. 23, 2018 (EP) ........................ 18184879

Signed and Sealed this
Eighteenth Day of July, 2023

Katherine Kelly Vidal
*Director of the United States Patent and Trademark Office*